US012617403B2

(12) United States Patent
Kim

(10) Patent No.: US 12,617,403 B2
(45) Date of Patent: May 5, 2026

(54) METHOD AND DEVICE FOR CONTROLLING DRIVING SPEED OF VEHICLE

(71) Applicant: HL KLEMOVE CORP., Incheon (KR)

(72) Inventor: Yong Hwan Kim, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 10 days.

(21) Appl. No.: 18/806,685

(22) Filed: Aug. 15, 2024

(65) Prior Publication Data

US 2025/0256721 A1     Aug. 14, 2025

(51) Int. Cl.
*B60W 30/18*          (2012.01)
*B60W 40/04*          (2006.01)

(52) U.S. Cl.
CPC    *B60W 30/18159* (2020.02); *B60W 30/18027* (2013.01); *B60W 30/181* (2013.01); *B60W 30/18154* (2013.01); *B60W 40/04* (2013.01); *B60W 2720/10* (2013.01)

(58) Field of Classification Search
CPC ..... B60W 30/18159; B60W 30/18027; B60W 30/181; B60W 30/18154; B60W 40/04; B60W 40/02; B60W 2720/10; B60W 2554/801; B60W 2555/60

USPC ........................................................ 701/70
See application file for complete search history.

(56) References Cited

U.S. PATENT DOCUMENTS

2020/0108826 A1*   4/2020   Kim ............... B60W 30/18159

FOREIGN PATENT DOCUMENTS

| JP | 2004258867 A | * | 9/2004 | ............... G08G 1/09 |
|----|----|----|----|----|
| KR | 10-0992626 | | 11/2010 | |
| KR | 20110004626 U | * | 5/2011 | ............. G08G 1/096 |
| KR | 20180031453 A | * | 3/2018 | ............. G08G 1/052 |
| KR | 101874359 B1 | * | 8/2018 | ............. G08G 1/095 |
| KR | 10-2021-0031066 | | 3/2021 | |
| KR | 10-2569283 | | 8/2023 | |

* cited by examiner

*Primary Examiner* — Hai H Huynh

(74) *Attorney, Agent, or Firm* — WOMBLE BOND DICKINSON (US) LLP

(57) ABSTRACT

The disclosure relates to technology for controlling a vehicle through determination of cut-in and provides a vehicle control device and method including receiving detection information related to a host vehicle and a surrounding vehicle, determining the cut-in intent of the surrounding vehicle based on the detection information to determine whether there is a cut-in ready vehicle and, when there is a cut-in ready vehicle, determining whether there is the cut-in vehicle based on the location in the lane of the cut-in ready vehicle.

14 Claims, 4 Drawing Sheets

METHOD AND DEVICE FOR CONTROLLING DRIVING SPEED OF VEHICLE

CROSS-REFERENCE TO RELATED APPLICATION

This application claims priority from Korean Patent Application No. 10-2024-0020810, filed on Feb. 14, 2024, which is hereby incorporated by reference for all purposes as if fully set forth herein.

BACKGROUND

Field

The disclosure relates to technology for controlling the driving speed of a vehicle passing through an intersection.

Description of Related Art

If the traffic light is red, the driver must stop the vehicle before the stop line, and if the traffic light is yellow, the driver must stop before the stop line or rush to pass.

Currently, there is no way to check the time remaining before the traffic light changes from green to red by looking at the traffic light alone, so the driver of a vehicle recklessly entering the intersection even when the traffic light has changed from green to yellow or red may end up stopping in the middle of the intersection, causing disturbance of other vehicles, or a traffic accident.

Conventionally, vehicle control has been performed by detecting the color of the traffic light located ahead or recognizing the arrow of the traffic light through a capturing means or a sensing means. However, it is difficult to accurately determine the time when the traffic light changes, leading to reckless entry of the vehicle into the intersection.

BRIEF SUMMARY

The disclosure provides technology for controlling the driving speed of a vehicle passing through an intersection.

In an aspect, the present embodiments provide a vehicle control device for controlling a driving speed of a vehicle at an intersection, comprising an information obtainer obtaining a remaining time output from a time indicator of a pedestrian traffic light, a determiner calculating an expected time required for the vehicle to pass through the intersection, and determining whether the vehicle may pass through the vehicle traffic light based on the expected time and the remaining time, and a controller controlling a driving speed of the vehicle based on a determination result of the determiner.

In another aspect, the present embodiments provide a vehicle control method for controlling a driving speed of a vehicle passing through an intersection, by a vehicle control device, comprising obtaining a remaining time output from a time indicator of a pedestrian traffic light, calculating an expected time required for the vehicle to pass through an intersection, and determining whether the vehicle may pass through the vehicle traffic light based on the expected time and the remaining time, and controlling a driving speed of the vehicle based on a determination result of determining whether the vehicle may pass through the vehicle traffic light.

The disclosure may provide technology for controlling the driving speed of a vehicle passing through an intersection.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
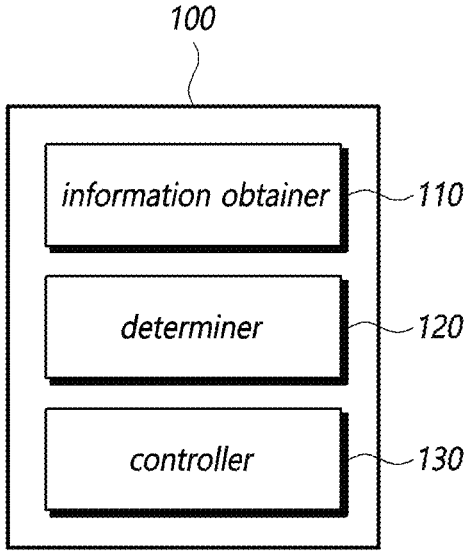
FIG. 1 is a view illustrating a configuration of a device for controlling a driving speed of a vehicle passing through an intersection, according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, embodiments are described in detail with reference to the accompanying drawings.

FIG. 1 is a view illustrating a configuration of an device for controlling a driving speed of a vehicle passing through an intersection, according to an embodiment.

Referring to FIG. 1, a vehicle control device 100 for controlling a driving speed of a vehicle at an intersection may include an information obtainer 110 for obtaining a remaining time output from a time indicator of a pedestrian traffic light.

For example, the pedestrian traffic light that outputs the remaining time may include a traffic light positioned at a crosswalk parallel to the driving direction of the vehicle.

As another example, the information obtainer 110 may further obtain the driving speed of the vehicle and information about the distance to a vehicle traffic light installed beyond the intersection in the driving direction of the vehicle.

The vehicle control device 100 of the disclosure aims to determine whether it is possible for the vehicle to pass through the vehicle traffic light installed beyond the intersection within the remaining time until the green signal of the pedestrian traffic light is changed to the red signal, and to control the driving speed of the vehicle according to a result of the determination.

Specifically, if the expected time required for the vehicle to pass through the intersection is shorter than the remaining time until the green signal of the pedestrian traffic light is changed to the red signal so that it is determined that the vehicle may pass through the vehicle traffic light within the remaining time, the vehicle control device 100 may control to maintain or accelerate the driving speed of the vehicle, or if it is determined that the vehicle may not pass through the vehicle traffic light within the remaining time, the vehicle control device 100 may control the vehicle to be decelerated so that the vehicle may pass through the intersection at the next signal, thereby preventing an unexpected accident due to reckless entry into the intersection.

Specifically, the expected time taken for the vehicle to pass through the intersection means the time taken for the vehicle to pass through the vehicle traffic light installed beyond the intersection from the current location of the vehicle, and the vehicle traffic light installed beyond the intersection means a vehicle traffic light installed beyond the intersection in the driving direction of the vehicle.

In order to calculate the expected time required for the vehicle to pass through the intersection, the information obtainer 110 of the disclosure may obtain the driving speed of the vehicle and information about the distance to the vehicle traffic light installed beyond the intersection in the driving direction of the vehicle.

The vehicle control device 100 for controlling the driving speed of the vehicle at the intersection may include a determiner 120 for calculating the expected time required for the vehicle to pass through the intersection and determining whether the vehicle may pass through the vehicle traffic light based on the expected time and the remaining time.

For example, the expected time may be calculated based on at least one of the distance from the current location of the vehicle to the vehicle traffic light, the driving speed, and whether there is another vehicle between the vehicle and the vehicle traffic light.

As another example, the expected time may be calculated based on the distance information and the driving speed when the number of other vehicles present between the vehicle and the vehicle traffic light is less than a first value.

The determiner of the disclosure calculates the expected time based on the driving speed and distance information when there is no other vehicle present around the vehicle or when the number is less than the first value. If there are many other vehicles driving around the vehicle, a sudden change in the current speed may occur, such as a case in which the speed of the vehicle may be required to be drastically reduced.

Further, when there are many other vehicles, if the speed of the vehicle is controlled based only on the expected time calculated based on the driving speed and distance information, there may be a risk of collision or accident between vehicles. "Other vehicle" as described above may refer to a vehicle driving in front of the host vehicle. Alternatively, "other vehicle" may refer to a vehicle driving on the left or right side of the host vehicle, or may refer to a vehicle driving behind the host vehicle.

Accordingly, when there are many other vehicles around the host vehicle, e.g., when the number of other vehicles driving around the vehicle is larger than or equal to the first value, the vehicle control device 100 may control the vehicle not to accelerate arbitrarily.

The first value is an integer of 0 or more and may be changed as needed.

The vehicle control device 100 of the disclosure may compare the remaining time output from the pedestrian traffic light with the expected time expected to take for the vehicle to pass through the intersection, based on the difference between the signal change time of the pedestrian traffic light and the change time of the vehicle traffic light installed beyond the intersection to determine whether the vehicle may pass through the intersection, and control the vehicle to accelerate or decelerate or, as necessary, maintain the speed according to the determination result.

For example, when the remaining time is less than the expected time or the number of other vehicles present between the vehicle and the traffic light is larger than or equal to the first value, the determiner 120 may determine that the vehicle may not pass. If the remaining time until the pedestrian traffic light is changed to the red signal is less than the expected time required for the vehicle to pass through the intersection, the vehicle may not pass through the intersection unless it accelerates from the current speed, and if it accelerates, an unexpected accident may occur.

As another example, when there are many other vehicles between the vehicle and the vehicle traffic light, even if the remaining time is larger than the expected time, the determiner 120 may determine that the vehicle may not pass regardless of the time comparison result because it may be required to rapidly reduce the speed when the other vehicles are dense at the intersection.

As another example, when the remaining time is larger than or equal to the expected time and the number of other vehicles present between the vehicle and the traffic light is less than the first value, the determiner 120 may determine that the vehicle may pass.

As another example, the determiner 120 may determine that the vehicle may sufficiently pass at the current speed when there is no other vehicle around the host vehicle entering the intersection or, the number of other vehicles is less than the first value and the remaining time is larger than or equal to the expected time as the result of the comparison between the remaining time and the expected time.

The vehicle control device 100 for controlling the driving speed of the vehicle at the intersection may include a controller 130 for controlling the driving speed of the vehicle based on the determination result of the determiner 120.

For example, when the determination result of the determiner 120 reveals that the vehicle may pass and the difference between the remaining time and the expected time is less than a second value, the controller 130 may control the vehicle to accelerate the driving speed of the vehicle.

As another example, when the difference between the remaining time and the expected time is not large even when the vehicle maintains the current speed, the controller 130 may control the vehicle to accelerate for rapid passage. The speed of the vehicle may be calculated based on a difference between the remaining time and the expected time and a distance from the vehicle to the vehicle traffic light. Alternatively, it may be preset to accelerate to K times the current driving speed (where K is a real number larger than 1).

The vehicle control device 100 of the disclosure controls the driving speed of the vehicle by comparing the remaining time taken for the pedestrian traffic light to change from the green signal to the red signal and the expected time taken for the vehicle to pass through the intersection, thereby preventing an unexpected accident, such as sudden stop due to reckless entry of the vehicle into the intersection or an abrupt change in the vehicle speed which may cause collision with another vehicle ahead or behind.

Hereinafter, a process of controlling a driving speed of a vehicle by comparing a remaining time with an expected time is described in detail with reference to FIG. 2.

Figure 2:
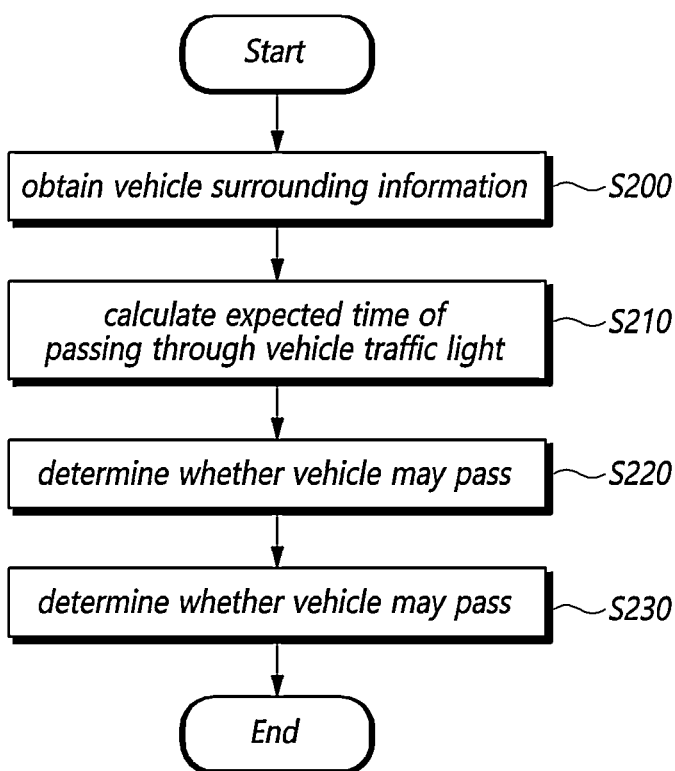
FIG. 2 is a flowchart illustrating a process of controlling, by a vehicle control device, a driving speed of a vehicle passing through an intersection, according to an embodiment.

FIG. 2 is a flowchart illustrating a process of controlling, by a vehicle control device, a driving speed of a vehicle passing through an intersection, according to an embodiment.

Referring to FIG. 2, a process of controlling, by a vehicle control device, a driving speed of a vehicle passing through an intersection may be performed as follows.

The vehicle control device obtains information about the surroundings of the vehicle including the remaining time information about the pedestrian traffic light (S200), calculates an expected time required for the vehicle to pass through the intersection (S210), determines the possibility of the vehicle passing (S220), and controls the speed of the vehicle according to the determination result (S230).

Specifically, the vehicle control device obtains vehicle surrounding information including remaining time information about the pedestrian traffic light (S200).

The vehicle control device of the disclosure may determine whether the vehicle may pass through the intersection before the vehicle traffic light is changed from the green signal to the red signal, and control the driving speed of the vehicle according to the result of the determination. Further, the vehicle control device may obtain remaining time information displayed on the pedestrian traffic light to determine whether the vehicle may pass, or obtain other information necessary to calculate the expected time required for the vehicle to pass through the intersection.

For example, the vehicle control device may obtain the remaining time displayed on the pedestrian traffic light through information detected by a sensing means installed in the vehicle or through image or photo information captured through a capturing means. Alternatively, when there is no time indicator on the pedestrian traffic light, the vehicle control device may directly receive the remaining time information through a center for managing the pedestrian traffic light. The method for obtaining the remaining time information about the pedestrian traffic light is not limited thereto, and may be variously set as necessary if the remaining time may be obtained in real time.

As another example, the vehicle control device may obtain information required to calculate the expected time required for the vehicle to pass through the traffic light. The information required to calculate the expected time may include at least one of the driving speed of the vehicle, the distance from the vehicle to the vehicle traffic light, the current location of the vehicle, and the number, location, and speed information about other vehicles positioned around the vehicle.

If the vehicle surrounding information is obtained, the vehicle control device calculates the expected time for the vehicle to pass through the intersection (S210).

As described above, the expected time taken for the vehicle to pass through the intersection means the time taken for the vehicle to pass through the vehicle traffic light installed beyond the intersection from the current location of the vehicle, and the vehicle traffic light installed beyond the intersection means a vehicle traffic light installed beyond the intersection in the driving direction of the vehicle.

The expected time may be calculated based on distance information between the vehicle and the vehicle traffic light and the driving speed of the vehicle. However, when there are many other vehicles in the lane, the driving speed of the host vehicle may also change unexpectedly depending on the driving speed of another vehicle, and thus the method for calculating the expected time may be applied differently depending on whether there is another vehicle.

For example, when the number of other vehicles in the lane is less than the preset first value, the vehicle control device may calculate the expected time based on the distance information between the vehicle and the traffic light and the driving speed of the vehicle. Specifically, the expected time may be calculated based on the distance information between the vehicle and the vehicle traffic light and the driving speed of the vehicle.

When the number of other vehicles is larger than or equal to the preset first value, the vehicle control device may calculate the expected time as any number larger than the remaining time of the pedestrian traffic light. Alternatively, the vehicle control device may determine that the vehicle may not pass, immediately without calculating the expected time so as to be unable to compare the remaining time with the expected time.

If the vehicle control device calculates the expected time for the vehicle to pass through the vehicle traffic light, the vehicle control device determines whether the vehicle may pass through the vehicle traffic light within the remaining time (S220).

When the remaining time of the pedestrian traffic light is larger than or equal to the calculated expected time, the vehicle control device may determine that the vehicle may pass. However, when the number of other vehicles in the lane is larger than or equal to the first value, the vehicle control device may determine that the vehicle may not pass despite the remaining time.

If the vehicle control device determines whether the vehicle may pass through the vehicle traffic light, the vehicle control device controls the speed of the vehicle according to the determination result (S230).

The speed control of the vehicle may be any one of maintaining the current speed, accelerating, and decelerating.

For example, if the vehicle control device determines that the vehicle may not pass through the intersection, the vehicle control device may control the vehicle to decelerate to prevent the vehicle from recklessly entering the intersection.

As another example, when it is determined that the vehicle may pass, the vehicle control device may calculate a difference between the remaining time and the expected time. If the calculated result is less than the set second value, the vehicle control device may control the vehicle to accelerate. Further, if the calculation result is the second value or more, the vehicle control device may maintain the current speed of the vehicle.

Further, according to the determination result, the vehicle control device may control the speed of the vehicle and transmit a message indicating the current situation to the driver or passenger on board the vehicle.

A method for transmitting a message by the vehicle control device may be a method for transmitting a message through an acoustic device mounted in the vehicle, or a method for transmitting a message through a display device.

For example, when it is determined that the vehicle may not pass, the vehicle control device may transmit a message including that the vehicle may not pass through the intersection at the current speed to the driver or passenger of the vehicle, and may control the vehicle to decelerate the speed.

As another example, when it is determined that the vehicle may pass and the remaining time is less than the second value than the expected time and thus acceleration control is required, the vehicle control device may control the vehicle to accelerate while transmitting a message indicating that the vehicle signal is to be changed soon to the driver or the passenger.

The content of the message and the method for transmitting the message are not limited thereto, and may be variously selected as necessary.

Figure 3:
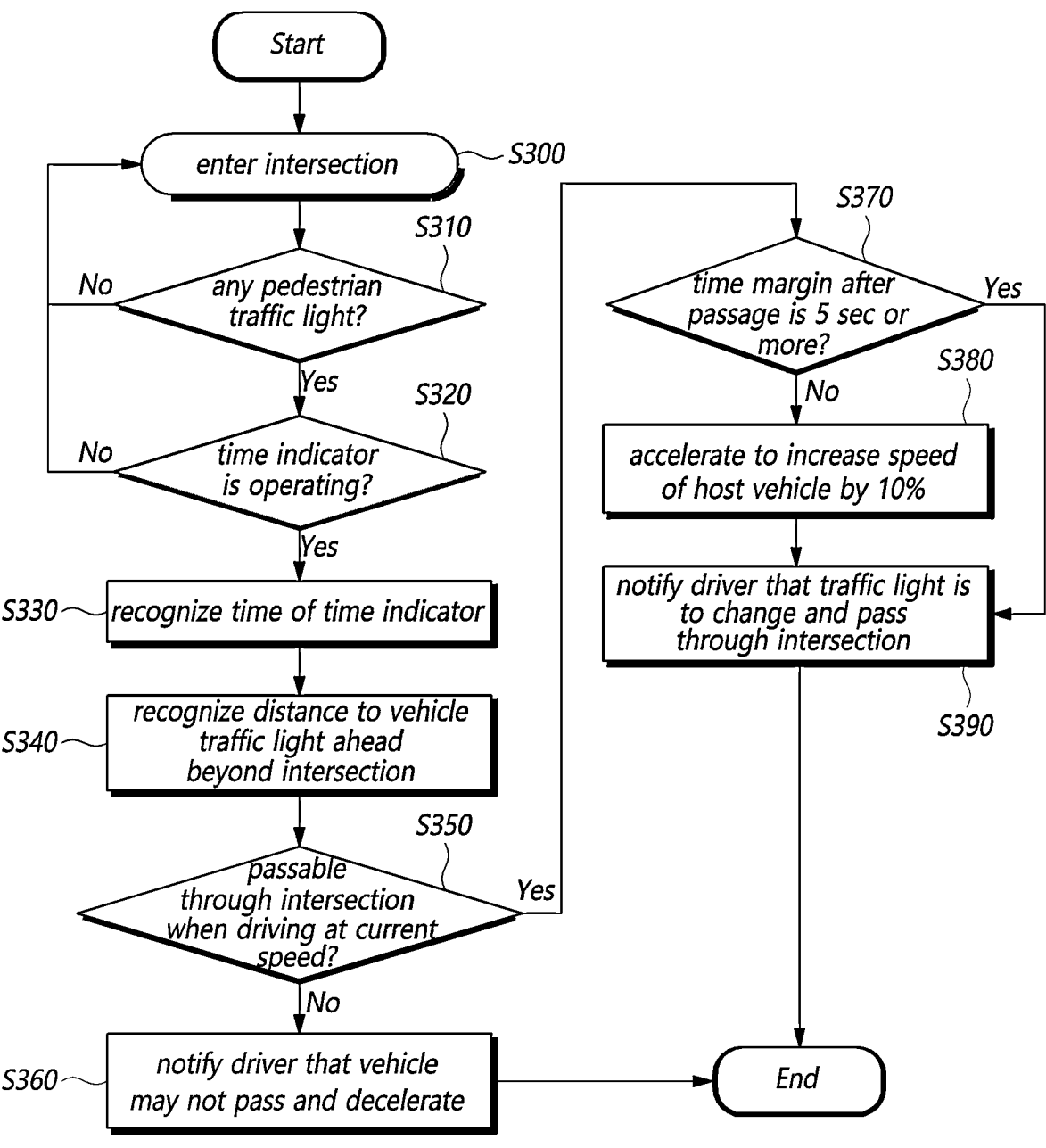
FIG. 3 is a flowchart illustrating an entire process of controlling, by a vehicle control device, a driving speed of a vehicle passing through an intersection, according to an embodiment.

FIG. 3 is a flowchart illustrating an entire process of controlling, by a vehicle control device, a driving speed of a vehicle passing through an intersection, according to an embodiment.

Referring to FIG. 3, the vehicle control device of the disclosure may compare the remaining time of the pedestrian traffic light with the expected time of passing the vehicle traffic light to determine the possibility of the vehicle passing through the intersection, and control the driving speed of the vehicle according to the determination result.

When the vehicle is expected to enter the intersection, the vehicle control device of the disclosure may calculate the expected time and determine the possibility of the vehicle passing through the intersection as described above (S300). In expecting entry into the intersection, the presence of the intersection ahead may be detected through a sensing means provided in the vehicle, or the presence of the intersection ahead based on the location information about the vehicle may be identified through a map.

If it is identified that there is the intersection in front of the vehicle, the vehicle control device identifies whether there is a pedestrian traffic light (S310). The disclosure takes advantage of the fact that the red signal change time of the pedestrian traffic light does not have a large error with the red signal change time of the vehicle traffic light positioned in front of the vehicle. The presence or absence of the pedestrian traffic light may be detected through the sensing means or the capturing means provided in the vehicle.

The pedestrian traffic light may be a traffic light positioned on a crosswalk parallel to the driving direction of the vehicle. However, the location of the pedestrian traffic light is not limited thereto, and any traffic light may be used as long as it does not have a large error with the signal change time of the vehicle signal light located in front of the vehicle.

If the presence of the pedestrian signal is identified, the vehicle control device identifies whether the time indicator of the pedestrian traffic light is operated (S320). The time indicator of the pedestrian traffic light may visually output the remaining time until it changes from the green signal to the red signal through the display device mounted on the pedestrian traffic light or may be transmitted through an acoustic device.

If the time indicator of the pedestrian traffic light is operated, the vehicle control device recognizes remaining time information output from the time indicator (S330). Alternatively, the remaining time information output from the time indicator detected by the sensing means or the capturing means provided in the vehicle may be obtained.

If the remaining time information is obtained, the vehicle control device recognizes distance information from the vehicle to the vehicle traffic light installed beyond the intersection (S340). Alternatively, distance information detected by the sensing means or the capturing means provided in the vehicle may be obtained. The information obtained by the vehicle control device of the disclosure is not limited to the remaining time information output from the time indicator of the pedestrian traffic light, and information including the driving speed, the location, the number of other vehicles around the vehicle, the driving speed, the location, and the distance from the vehicle to the vehicle traffic light may also be obtained as necessary.

If the distance information from the vehicle to the vehicle traffic light is obtained, the vehicle control device determines whether the vehicle may pass through the intersection within the remaining time at the current speed of the vehicle (S350). The vehicle control device may determine whether the vehicle may pass through the intersection within the remaining time by comparing the expected time calculated based on the current speed of the vehicle and the distance information to the vehicle traffic light with the remaining time. However, if there are many other vehicles around the vehicle, there is a possibility that the current speed of the vehicle may change rapidly, and thus the vehicle control device may refrain from calculating the expected time or, even if calculating, may determine that the vehicle may not pass and control the vehicle to decelerate.

If it is determined that the vehicle may not pass through the intersection within the remaining time when driving at the current speed, the vehicle control device sends a massage indicating that the vehicle may not pass to the driver or the passenger, and controls the vehicle to decelerate (S360). The case where it is determined that the vehicle may not pass through the intersection may be a case where the remaining time is less than the expected time, or there are as many other vehicles around the vehicle as the first value or more.

If it is determined that the vehicle may pass through the intersection within the remaining time while driving at the current speed, the vehicle control device may determine whether the difference between the remaining time and the expected time is less than the predetermined second value (S370). If the difference between the remaining time and the expected time is less than the second value, there is not much time to spare, so that the vehicle control device controls the vehicle to accelerate to pass quickly. For example, in a case where a criterion for controlling the vehicle to accelerate is that the remaining time is 5 seconds or more larger than the expected time, if the difference between the remaining time and the expected time is 5 seconds or more, the vehicle control device may control the vehicle to maintain the current state and, if the remaining time is 5 seconds less than the expected time, the vehicle control device may control the vehicle to accelerate. 5 seconds, which is a criterion for controlling to accelerate, is merely an example and, as necessary, various times may be set.

When the difference between the remaining time and the expected time is less than the preset second value, the vehicle control device controls the vehicle to accelerate the speed of the vehicle according to the set criterion (S380). For example, when the difference between the remaining time and the expected time is less than the second value but it is determined that the vehicle may pass, the vehicle control device may increase the speed of the vehicle by 10% to control the vehicle to pass quickly. Alternatively, when the difference between the remaining time and the expected time is larger than or equal to the second value, the vehicle control device may control the vehicle to drive at the current speed. 10%, which is a criterion for increasing the speed, is merely an example, and various values may be set as necessary.

The vehicle control device controls the speed of the vehicle and notifies the driver that the signal of the vehicle traffic light is changed to the red signal soon (S390). The content of the message for notifying the driver may include remaining time information and, as necessary, may include various information. Additionally, the notification method may include sending a voice message through an acoustic device or sending a message visually through a display device. However, without limitations to the notification method, it may be transferred to the driver or passenger by other various methods as necessary.

Each of the above-described steps is an example, and the disclosure is not limited thereto, and some steps may be omitted, or the order of performance may be different.

Figure 4:
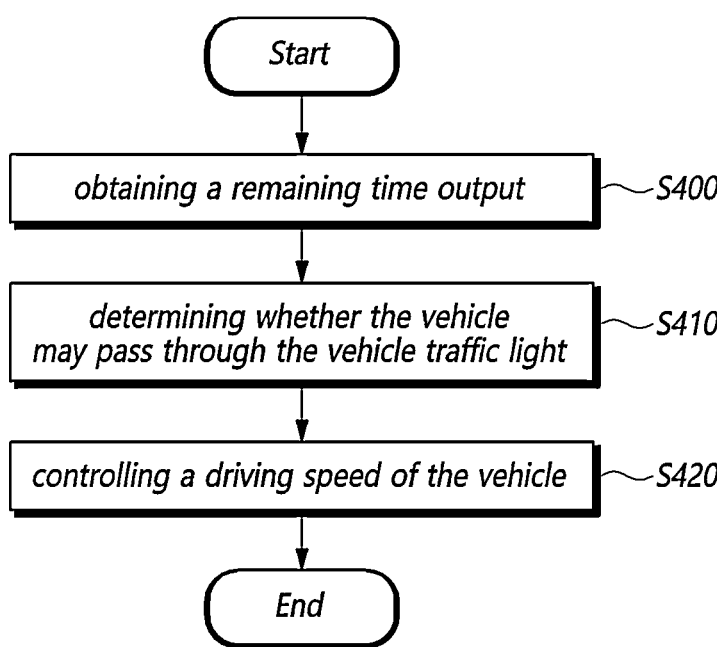
FIG. 4 is a view illustrating a method for controlling, by a vehicle control device, a driving speed of a vehicle passing through an intersection, according to an embodiment.

FIG. 4 is a view illustrating a method for controlling, by a vehicle control device, a driving speed of a vehicle passing through an intersection, according to an embodiment.

Referring to FIG. 4, a vehicle control method for controlling a driving speed of a vehicle at an intersection may include obtaining a remaining time output from a time indicator of a pedestrian traffic light (S400).

For example, the pedestrian traffic light that outputs the remaining time may include a traffic light positioned at a crosswalk parallel to the driving direction of the vehicle.

As another example, obtaining a remaining time output may further obtain the driving speed of the vehicle and information about the distance to a vehicle traffic light installed beyond the intersection in the driving direction of the vehicle.

The vehicle control method of the disclosure aims to determine whether it is possible for the vehicle to pass through the vehicle traffic light installed beyond the intersection within the remaining time until the green signal of the pedestrian traffic light is changed to the red signal, and to control the driving speed of the vehicle according to a result of the determination.

Specifically, if the expected time required for the vehicle to pass through the intersection is shorter than the remaining time until the green signal of the pedestrian traffic light is changed to the red signal so that it is determined that the vehicle may pass through the vehicle traffic light within the remaining time, the vehicle control method of the disclosure may control to maintain or accelerate the driving speed of the vehicle, or if it is determined that the vehicle may not pass, the vehicle control method may control the vehicle to be decelerated so that the vehicle may pass through the intersection at the next signal, thereby preventing an unexpected accident due to reckless entry into the intersection.

Specifically, the expected time taken for the vehicle to pass through the intersection means the time taken for the vehicle to pass through the vehicle traffic light installed beyond the intersection from the current location of the vehicle, and the vehicle traffic light installed beyond the intersection means a vehicle traffic light installed beyond the intersection in the driving direction of the vehicle.

In order to calculate the expected time required for the vehicle to pass through the intersection, obtaining a remaining time output of the disclosure may obtain the driving speed of the vehicle and information about the distance to the vehicle traffic light installed beyond the intersection in the driving direction of the vehicle.

The vehicle control method for controlling the driving speed of the vehicle at the intersection may include calculating the expected time required for the vehicle to pass through the intersection and determining whether the vehicle may pass through the vehicle traffic light based on the expected time and the remaining time (S410).

For example, the expected time may be calculated based on at least one of the distance from the current location of the vehicle to the vehicle traffic light, the driving speed, and whether there is another vehicle between the vehicle and the vehicle traffic light.

As another example, the expected time may be calculated based on the distance information and the driving speed when the number of other vehicles present between the vehicle and the vehicle traffic light is less than a first value.

Determining whether the vehicle may pass through the vehicle traffic light of the disclosure calculates the expected time based on the driving speed and distance information when there is no other vehicle present around the vehicle or when the number is less than the first value. If there are many other vehicles driving around the vehicle, a sudden change in the current speed may occur, such as a case in which the speed of the vehicle may be required to be drastically reduced.

Further, when there are many other vehicles, if the speed of the vehicle is controlled based only on the expected time calculated based on the driving speed and distance information, there may be a risk of collision or accident between vehicles. "Other vehicle" as described above may refer to a vehicle driving in front of the host vehicle. Alternatively, "other vehicle" may refer to a vehicle driving on the left or right side of the host vehicle, or may refer to a vehicle driving behind the host vehicle.

Accordingly, when there are many other vehicles around the host vehicle, e.g., when the number of other vehicles driving around the vehicle is larger than or equal to the first value, the vehicle control method may control the vehicle not to accelerate arbitrarily.

The first value is an integer of 0 or more and may be changed as needed.

The vehicle control method of the disclosure may compare the remaining time output from the pedestrian traffic light with the expected time expected to take for the vehicle to pass through the intersection, based on the difference between the signal change time of the pedestrian traffic light and the change time of the vehicle traffic light installed beyond the intersection to determine whether the vehicle may pass through the intersection, and control the vehicle to accelerate or decelerate or, as necessary, maintain the speed according to the determination result.

For example, when the remaining time is less than the expected time or the number of other vehicles present between the vehicle and the traffic light is larger than or equal to the first value, determining whether the vehicle may pass through the vehicle traffic light may determine that the vehicle may not pass. If the remaining time until the pedestrian traffic light is changed to the red signal is less than the expected time required for the vehicle to pass through the intersection, the vehicle may not pass through the intersection unless it accelerates from the current speed, and if it accelerates, an unexpected accident may occur.

Further, when there are many other vehicles between the vehicle and the vehicle traffic light, even if the remaining time is larger than the expected time, determining whether the vehicle may pass through the vehicle traffic light may determine that the vehicle may not pass regardless of the time comparison result because it may be required to rapidly reduce the speed when the other vehicles are dense at the intersection.

As another example, when the remaining time is larger than or equal to the expected time and the number of other vehicles present between the vehicle and the traffic light is less than the first value, determining whether the vehicle may pass through the vehicle traffic light may determine that the vehicle may pass.

As another example, determining whether the vehicle may pass through the vehicle traffic light may determine that the vehicle may sufficiently pass at the current speed when there is no other vehicle around the host vehicle entering the intersection or, the number of other vehicles is less than the first value and the remaining time is larger than or equal to the expected time as the result of the comparison between the remaining time and the expected time.

The vehicle control method for controlling the driving speed of the vehicle at an intersection may include controlling the driving speed of the vehicle based on the determination result of determining whether the vehicle may pass through the vehicle traffic light (S420).

For example, when the determination result of determining whether the vehicle may pass through the vehicle traffic light reveals that the vehicle may pass and the difference between the remaining time and the expected time is less than a second value, controlling the driving speed of the vehicle may control the vehicle to accelerate the driving speed of the vehicle.

As another example, when the difference between the remaining time and the expected time is not large even when the vehicle maintains the current speed, controlling the driving speed of the vehicle may control the vehicle to accelerate for rapid passage. The speed of the vehicle may be calculated based on a difference between the remaining time and the expected time and a distance from the vehicle to the vehicle traffic light. Alternatively, it may be preset to accelerate to K times the current driving speed (where K is a real number larger than 1).

The vehicle control method of the disclosure controls the driving speed of the vehicle by comparing the remaining time taken for the pedestrian traffic light to change from the green signal to the red signal and the expected time taken for the vehicle to pass through the intersection, thereby preventing an unexpected accident, such as sudden stop due to reckless entry of the vehicle into the intersection or an abrupt change in the vehicle speed which may cause collision with another vehicle ahead or behind.

Through the operations of the above-described steps, it is possible to accurately determine whether the vehicle may pass the intersection before the vehicle traffic light changes to red and to control the speed of the vehicle according to the determination result. Accordingly, it is possible to prevent reckless entry of a vehicle into an intersection and an unexpected vehicle accident.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A vehicle control device for controlling a driving speed of a vehicle at an intersection, comprising:
   an information obtainer obtaining a remaining time output from a time indicator of a pedestrian traffic light, a driving speed of the vehicle, and distance information, in a driving direction of the vehicle, to a vehicle traffic light installed at the intersection;
   a determiner calculating an expected time required for the vehicle to pass through the intersection, and determining whether the vehicle may pass through the vehicle traffic light based on the expected time and the remaining time; and
   a controller controlling a driving speed of the vehicle based on a determination result of the determiner,
   wherein the determiner calculates the expected time based on information about whether there is at least one other vehicle present between the vehicle and the vehicle traffic light in addition to the distance information to the vehicle traffic light and the driving speed.

2. The vehicle control device of claim 1, wherein the pedestrian traffic light is a traffic light located at a crosswalk parallel to a driving direction of the vehicle.

3. The vehicle control device of claim 1, wherein the expected time is calculated based on the distance information and the driving speed when a number of the at least one other vehicles present between the vehicle and the vehicle traffic lights is less than a first value.

4. The vehicle control device of claim 1, wherein the determiner determines that the vehicle may not pass when the remaining time is less than the expected time or when a number of the at least one other vehicles present between the vehicle and the vehicle traffic light is larger than or equal to a first value.

5. The vehicle control device of claim 1, wherein the determiner determines that the vehicle may pass when the remaining time is larger than or equal to the expected time and a number of the at least one other vehicle present between the vehicle and the vehicle traffic light is less than a first value.

6. The vehicle control device of claim 5, wherein the controller controls to accelerate the driving speed of the vehicle when the determination result of the determiner is that the vehicle may pass and a difference between the remaining time and the expected time is less than a second value.

7. A vehicle control method, comprising:

obtaining a remaining time output from a time indicator of a pedestrian traffic light, a driving speed of a vehicle, and distance information, in a driving direction of the vehicle, to a vehicle traffic light installed at the intersection;

calculating an expected time required for the vehicle to pass through an intersection, and determining whether the vehicle may pass through the vehicle traffic light based on the expected time and the remaining time; and controlling a driving speed of the vehicle based on a determination result of determining whether the vehicle may pass through the vehicle traffic light, wherein the expected time is calculated based on information about whether there is at least one other vehicle present between the vehicle and the vehicle traffic light in addition to the distance information to the vehicle traffic light and the driving speed.

8. The vehicle control method of claim 7, wherein the pedestrian traffic light is a traffic light located at a crosswalk parallel to a driving direction of the vehicle.

9. The vehicle control method of claim 7, wherein the expected time is calculated based on the distance information and the driving speed when a number of the at least one other vehicles present between the vehicle and the vehicle traffic lights is less than a first value.

10. The vehicle control method of claim 7, wherein determining whether the vehicle may pass through the vehicle traffic light determines that the vehicle may not pass when the remaining time is less than the expected time or when a number of the at least one other vehicles present between the vehicle and the vehicle traffic light is larger than or equal to a first value.

11. The vehicle control method of claim 7, wherein determining whether the vehicle may pass through the vehicle traffic light determines that the vehicle may pass when the remaining time is larger than or equal to the expected time and a number of the at least one other vehicle present between the vehicle and the vehicle traffic light is less than a first value.

12. The vehicle control method of claim 11, wherein controlling a driving speed of the vehicle controls to accelerate the driving speed of the vehicle when the determination result of the determiner is that the vehicle may pass and a difference between the remaining time and the expected time is less than a second value.

13. A vehicle control device for controlling a driving speed of a vehicle at an intersection, comprising:

an information obtainer obtaining a remaining time output from a time indicator of a pedestrian traffic light, which is a traffic light located at a crosswalk parallel to a driving direction of the vehicle, through image or photo information captured through a capturing means equipped with the vehicle;

a determiner calculating an expected time required for the vehicle to pass through the intersection, and determining whether the vehicle may pass through the vehicle traffic light based on the expected time and the remaining time; and a controller controlling a driving speed of the vehicle based on a determination result of the determiner.

14. The vehicle control device of claim 13, wherein the information obtainer further obtains a driving speed of the vehicle, and distance information, in a driving direction of the vehicle, to a vehicle traffic light installed at the intersection, wherein the determiner calculates the expected time based on information about whether there is at least one other vehicle present between the vehicle and the vehicle traffic light in addition to the distance information to the vehicle traffic light and the driving speed.

\* \* \* \* \*